United States Patent
Tomomori et al.

(10) Patent No.: US 9,080,692 B2
(45) Date of Patent: Jul. 14, 2015

(54) STEEL SHEET USED TO MANUFACTURE PIPE AND HAVING CORROSION-RESISTANT PROPERTIES AGAINST FUEL VAPORS, AND PIPE AND FUEL SUPPLY PIPE THAT USE SAME

(75) Inventors: Tatsuo Tomomori, Yamaguchi (JP); Koh Yoshioka, Yamaguchi (JP); Hideyuki Minagi, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 618 days.

(21) Appl. No.: 13/496,876

(22) PCT Filed: Sep. 16, 2010

(86) PCT No.: PCT/JP2010/005645
§ 371 (c)(1),
(2), (4) Date: Jun. 4, 2012

(87) PCT Pub. No.: WO2011/033774
PCT Pub. Date: Mar. 24, 2011

(65) Prior Publication Data
US 2012/0234426 A1    Sep. 20, 2012

(30) Foreign Application Priority Data
Sep. 18, 2009 (JP) ................................. 2009-216606

(51) Int. Cl.
*F16L 9/14* (2006.01)
*F16L 9/02* (2006.01)
(Continued)

(52) U.S. Cl.
CPC ... *F16L 9/02* (2013.01); *C25D 5/12* (2013.01); *C25D 5/36* (2013.01); *C25D 5/50* (2013.01); *C25D 7/04* (2013.01); *C25D 3/12* (2013.01); *Y10T 428/12972* (2015.01)

(58) Field of Classification Search
USPC .................................................. 138/146, 143
See application file for complete search history.

(56) References Cited

U.S. PATENT DOCUMENTS 3,598,156 A * 8/1971 Ulmer et al. .................. 138/143
4,012,239 A * 3/1977 Brun et al. ..................... 148/276
(Continued)

FOREIGN PATENT DOCUMENTS

JP    61-235594 A    10/1986
JP    06-002104 A    1/1994
(Continued)

OTHER PUBLICATIONS

International Search Report with English translation, mailing date Nov. 2, 2010, for corresponding International application No. PCT/JP2010/005645.

*Primary Examiner* — James Hook
(74) *Attorney, Agent, or Firm* — Intellectual Property Law Group LLP

(57) ABSTRACT

Provided is a steel sheet for manufacturing a pipe having corrosion resistance against fuel vapor of fuel such as gasoline, light oil, bioethanol or bio-diesel fuel, and a pipe and a fuel supply pipe. In the steel sheet for manufacturing a pipe, a Fe—Ni diffusion layer and a softened Ni layer which is provided on the Fe—Ni diffusion layer are formed on a surface of a steel sheet, and a thickness of the softened Ni layer is set to a value which falls within a range of 0.9 to 8.1 μm thus having corrosion resistance against fuel vapor. In the pipe and the fuel supply pipe, a Fe—Ni diffusion layer and a softened Ni layer which is provided on the Fe—Ni diffusion layer are formed on an inner surface of a pipe formed of a steel sheet, and a thickness of the softened Ni layer is set to a value which falls within a range of 0.9 to 8.1 μm. In a fuel supply pipe 20 for supplying fuel to a fuel tank 23, the fuel supply pipe includes: a large-diameter pipe portion 21 through which the fuel passes; and a small-diameter pipe portion 22 which makes an upper portion of the large-diameter pipe portion and a lower portion of the large-diameter pipe portion communicate with each other for ventilation, and a Fe—Ni diffusion layer and a softened Ni layer which is provided on the Fe—Ni diffusion layer are formed on an inner surface of at least the small-diameter pipe portion, and a thickness of the softened Ni layer is set to a value which falls within a range of 0.9 to 8.1 μm.

1 Claim, 2 Drawing Sheets

(51) Int. Cl.
  *C25D 5/12* (2006.01)
  *C25D 5/36* (2006.01)
  *C25D 5/50* (2006.01)
  *C25D 7/04* (2006.01)
  *C25D 3/12* (2006.01)

(56) References Cited

U.S. PATENT DOCUMENTS

| | | | | |
|---|---|---|---|---|
| 5,277,228 A | * | 1/1994 | Yamanashi | 138/143 |
| 5,993,994 A | * | 11/1999 | Ohmura et al. | 429/176 |
| 8,147,984 B2 | * | 4/2012 | Kashima et al. | 428/679 |
| 2005/0103637 A1 | * | 5/2005 | Yamasaki et al. | 205/170 |

FOREIGN PATENT DOCUMENTS

| | | |
|---|---|---|
| JP | 11-117826 A | 4/1999 |
| JP | 2000-17450 A | 1/2000 |
| JP | 2002-061552 A | 2/2002 |
| JP | 2002-371933 A | 12/2002 |

* cited by examiner

STEEL SHEET USED TO MANUFACTURE PIPE AND HAVING CORROSION-RESISTANT PROPERTIES AGAINST FUEL VAPORS, AND PIPE AND FUEL SUPPLY PIPE THAT USE SAME

CROSS-REFERENCE TO RELATED APPLICATIONS

This application is a U.S. National Phase application, under 35 U.S.C. §371, of International Application no. PCT/JP2010/005645, with an international filing date of Sep. 16, 2010, and claims benefit of Japanese Application no. 2009-216606 filed on Sep. 18, 2009, and which are hereby incorporated by reference for all purposes.

TECHNICAL FIELD

The present invention relates to a surface treated steel sheet having corrosion resistance against fuel vapors.

BACKGROUND ART

Recently, for reducing a greenhouse effect gas, the movement toward the use of so-called bioethanol mixed gasoline produced by mixing bioethanol which is considered neutral to carbon into gasoline has been advancing steadily. However, when ethanol is added to gasoline, gasoline is liable to absorb moisture and hence, there is a possibility that water is mixed into gasoline in a fuel tank.

Further, when ethanol mixed gasoline is left for a long period, gasoline is deteriorated and an organic acid is formed in gasoline.

In this manner, when a moisture absorbed state and the deterioration of gasoline take place, ethanol can be mixed into both water and gasoline and hence, there arises a state where both water and an organic acid are contained in gasoline whereby there may be a case where the mixture of water and an organic acid is vaporized from a surface of gasoline. In such a case, an inner surface of a pipe which usually contacts with only gasoline vapor which substantially has no corrosiveness is exposed to a strong corrosive environment.

Accordingly, a pipe which is placed in an atmosphere of bioethanol mixed gasoline is required to possess corrosion resistance which is determined by taking into account such a corrosive environment.

To cope with such a corrosive environment, for example, patent document 1 discloses a fuel container for an automobile which has excellent corrosion resistance. The fuel container is manufactured such that a chromate film having a coating weight of ≤100 mg/m² expressed in terms of Cr and comprising an chromic acid, silica, an inorganic phosphoric acid and an organic phosphoric acid is applied to a surface of a steel sheet on which a Sn—Zn alloy plating having a coating weight of 10-70 g/m² and a Zn content of 1-50% in the alloy is formed, or, as the additional treatment, a resin-chromate film containing an organic resin is applied to the chromate film, and flange parts of a pair of bowl-shaped formed bodies having flanges are formed into an integral body by seam welding.

PRIOR ART DOCUMENT

Patent Document

Patent document 1: JP-A-2000-17450

SUMMARY OF THE INVENTION

Problems that the Invention is to Solve

However, with respect to a raw material used for manufacturing the fuel container for an automobile disclosed in the above-mentioned patent document 1, the required corrosion resistance in patent document 1 is the corrosion resistance of the raw material of a part of a fuel tank or the like which is immersed in automobile-use fuel such as gasoline and directly contacts with automobile-use fuel, but is not the corrosion resistance of the raw material against vapor of the automobile-use fuel.

For example, with respect to a pipe which is connected to a fuel tank such as a fuel supply pipe, as an actual use environment, the number of cases where the pipe is exposed to highly volatile vapor of automobile-use fuel is overwhelmingly larger than the number of cases where the pipe is directly exposed to automobile-use fuel.

Internationally, the problem on exhaustion of fossil fuels has been becoming seriously, and the use of bioethanol, bio-diesel fuel and the like has been spreading.

In this manner, in addition to gasoline which has been the conventional automobile fuel, there has been a demand for a raw material having sufficient properties against bioethanol, bio-diesel fuel and vapors of gasoline, bioethanol, bio-diesel fuel and the like.

Accordingly, the present invention has been made to overcome the above-mentioned conventional drawbacks, and it is an object of the present invention to provide a steel sheet for manufacturing a pipe having sufficient corrosion resistance against fuel, particularly, fuel vapor of fuel such as gasoline, light oil (diesel oil), bioethanol or bio-diesel fuel.

Further, it is another object of the present invention to provide a pipe which uses the steel sheet and a fuel supply pipe which uses the steel sheet.

Means for Solving the Problems (1) A steel sheet for manufacturing a pipe having corrosion resistance against fuel vapor according to the present invention is characterized in that a Fe—Ni diffusion layer and a softened Ni layer which is provided on the Fe—Ni diffusion layer are formed on at least one surface of a steel sheet, and a thickness of the softened Ni layer is set to a value which falls within a range of 0.9 to 8.1 μm.

(2) The steel sheet for manufacturing a pipe according to the present invention is, in the above-mentioned constitution (1), characterized in that the fuel is gasoline, light oil, bioethanol or bio-diesel fuel.

(3) A pipe having corrosion resistance against fuel vapor according to the present invention is characterized in that a Fe—Ni diffusion layer and a softened Ni layer which is provided on the Fe—Ni diffusion layer are formed on an inner surface of a pipe formed of a steel sheet, and a thickness of the softened Ni layer is set to a value which falls within a range of 0.9 to 8.1 μm.

(4) The pipe according to the present invention is, in the above-mentioned constitution (3), characterized in that the fuel is gasoline, light oil, bioethanol or bio-diesel fuel.

(5) A fuel supply pipe according to the present invention is characterized in that the fuel supply pipe is provided for supplying fuel to a fuel tank, wherein the fuel supply pipe includes:

a large-diameter pipe (main pipe) portion through which the fuel passes; and a small-diameter pipe (breather pipe) portion which makes an upper portion of the large-diameter pipe portion and a lower portion of the large-diameter pipe portion communicate with each other for ventilation, and a Fe—Ni diffusion layer and a softened Ni layer which is provided on the Fe—Ni diffusion layer are formed on an inner surface of at least the small-diameter pipe portion, and a thickness of the softened Ni layer is set to a value which falls within a range of 0.9 to 8.1 μm thus having corrosion resistance against fuel vapor.

(6) The fuel supply pipe according to the present invention is, in the above-mentioned constitution (5), characterized in that the fuel is gasoline, light oil, bioethanol or bio-diesel fuel.

Advantageous Effects of the Invention

The steel sheet for manufacturing a pipe, the pipe which uses the steel sheet and the fuel supply pipe which uses the steel sheet according to the present invention can suppress the generation of rust even when they are exposed to fuel vapor of fuel such as gasoline, light oil, bioethanol or bio-diesel fuel.

BRIEF DESCRIPTION OF THE DRAWINGS

FIGS. 2(a) and 2(b) are a schematic explanatory view of a fuel supply pipe which uses the steel sheet according to the present invention, wherein FIG. 2(a) shows a fuel supply pipe which includes: a large-diameter pipe portion through which the fuel passes; and a small-diameter pipe portion which makes an upper portion of the large-diameter pipe portion and a lower portion of the large-diameter pipe portion communicate with each other for ventilation, and FIG. 2(b) shows a fuel supply pipe where a large-diameter pipe portion through which the fuel passes and a small-diameter pipe portion are formed independently.

MODE FOR CARRYING OUT THE INVENTION

Figure 1:
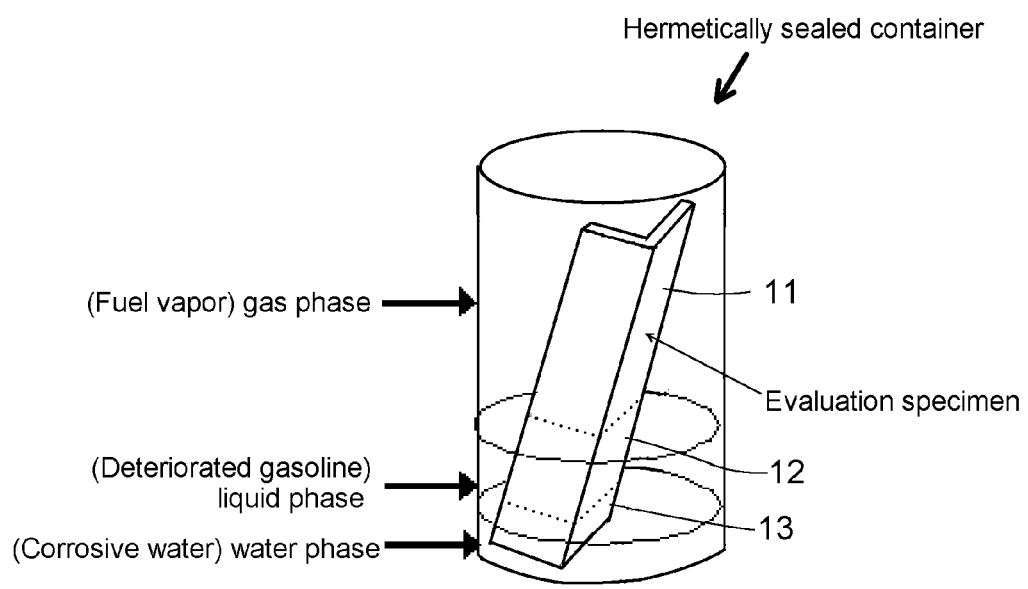
FIG. 1 is a schematic explanatory view showing a method of a corrosion resistance test of a steel sheet according to the present invention for bioethanol mixed gasoline.

An embodiment of the present invention is explained in detail hereinafter.

<Steel Sheet>

Usually, a low carbon aluminum-killed hot-rolled coil is used as a material sheet of a steel sheet for manufacturing a pipe.

Further, a coil manufactured by using ultra low carbon steel which contains 0.003 weight % or less of carbon, or a coil manufactured by using non-aging continuous cast steel which is manufactured by further adding niobium and titanium to the ultra low carbon steel is also used.

<Pretreatment Before Plating>

As pretreatment before nickel plating explained hereinafter, usually, a scale (oxide film) formed on a surface of a hot-rolled steel sheet is removed by applying electrolytic cleaning or cleaning by immersion to the hot-rolled steel sheet using an alkali solution containing caustic soda as a main agent. After the scale is removed, the steel sheet is rolled in a cold-rolling step until the steel sheet obtains a product thickness (cold rolled plate).

<Annealing>

After cleaning rolling oil which adheres to the steel sheet in rolling by electrolytic cleaning, the steel sheet is annealed. Annealing may be performed by either one of continuous annealing and box annealing, and is not limited specifically. After annealing is applied to the steel sheet, a shape of the steel sheet is modified.

<Nickel Plating>

Next, nickel plating is applied to the annealed steel sheet. In general, although a nickel sulfate bath which is referred to as a watt bath is mainly used as a nickel plating bath, besides the nickel sulfate bath, a sulfamic acid bath, a borofluoride bath, a chloride bath or the like can be used. A thickness of nickel plating in performing plating using these bathes is set to a value which falls within a range of 2 to 10 μm. The reason of such setting of the thickness of nickel plating is described in the following column "Evaluation method".

Such plating thickness can be obtained, in a case where a typical watt bath is used, by using a bath where the bath composition contains 200 to 350 g/L of nickel sulfate, 20 to 50 g/L of nickel chloride and 20 to 50 g/L of boric acid, pH is 3.6 to 4.6 and a bath temperature is 50 to 65° C. and an electrolytic condition is set such that current density is 5 to 50 A/dm$^2$ and the total of coulombs is approximately 600 to 3000 c/dm$^2$. Although a boric acid is added as a stabilizer, a citric acid may be added in place of the boric acid.

Here, as nickel plating which is formed by a watt bath, matte nickel plating where an organic compound is not added to a plating bath except for a pit prevention agent, semi-bright nickel plating where an organic compound referred to as a leveling agent which makes a precipitated crystal surface of a plating layer smooth is added to a plating bath, and bright nickel plating where an organic compound which contains a sulfur component for making a plating layer bright by making the nickel plating crystal structure fine in addition to the leveling agent are named. Any one of these plating can be used in the present invention.

<Diffusion>

Next, heat treatment for forming a Fe—Ni diffusion layer is performed after Ni plating.

This heat treatment is provided for enhancing the adhesiveness between base steel and a plating layer by softening and recrystallizing nickel plating which is in a microcrystalline state. This heat treatment is also provided for enhancing film formability (followability) in pipe forming, bending or spool forming (rotating eccentric forming) by forming the Fe—Ni diffusion layer on the steel sheet by heat treatment.

As a method for diffusing Ni by heat treatment, a method which uses a continuous annealing furnace or a method which uses a box-like annealing furnace is named. A Ni diffusion temperature which falls within a range from 400° C. to 800° C. and a Ni diffusion time which falls within a range from 60 seconds to 12 hours are used in usual Ni diffusion by heating. However, diffusion treatment may be applied for 12 hours or more.

A diffusion gas atmosphere may be a non-oxidization protective gas atmosphere or a reduction protective gas atmosphere.

In the present invention, as a heat treatment method by box annealing, preferably used is the heat treatment which uses a protective gas consisting of 75% of hydrogen and 25% of nitrogen produced by an ammonia crack method referred to as hydrogen enriched annealing with favorable heat transfer. In this method, favorable uniformity of temperature distribution is acquired in the inside of a steel strip in the longitudinal direction as well as in the widthwise direction of the steel strip and hence, the method has an advantageous effect that irregularities in the Fe—Ni diffusion layer in the inside of the steel strip or the irregularities in the Fe—Ni diffusion layer between steel strips can be decreased.

In the diffusion treatment, when the heat treatment is continued even after iron reaches an uppermost surface of the Fe—Ni diffusion layer, a rate of iron which is exposed in an uppermost surface layer is increased.

By variously changing the heat treatment condition with respect to respective plating thicknesses, a thickness of the softened Ni layer and a thickness of the Fe—Ni diffusion layer are calculated based on a result of a glow discharge emission analysis, that is, a GDS analysis (using GDLS-5017 made by Shimazu Corporation). A large number of experiments are carried out thus preparing a large number of samples which differ in the thickness of the softened Ni layer and the thickness of the Fe—Ni diffusion layer respectively.

The GDS analysis is a measuring method by which an analysis chart in the depth direction is acquired. According to the present invention, it is regarded that Ni and Fe are respectively present until intensities of Ni and Fe become 1/10 of the maximum intensity values thereof.

The thickness of the softened Ni layer is expressed by a measured time by the GDS analysis ranging from a measured time 0 indicative of a surface layer to a measured time where intensity of Fe becomes 1/10 of the maximum intensity value.

The thickness of the Fe—Ni diffusion layer is expressed by a measured time by the GDS analysis ranging from a point of time that the intensity of Fe becomes 1/10 of the maximum intensity value to a point of time that intensity of Ni becomes 1/10 of the maximum intensity value.

With respect to the Ni plating layer before the heat treatment is performed, a thickness of the Ni plating layer is expressed by a measured time by the GDS analysis ranging from a measured time 0 indicative of a surface layer to a measured time where intensity of Ni becomes 1/10 of the maximum intensity value. The thickness of the Ni plating layer is actually measured using an X-ray fluorometric analysis.

A ratio among the measured time of the Ni plating layer by the GDS analysis, the measured time of the softened Ni plating layer by the GDS analysis and the measured time of the Fe—Ni diffusion layer by the GDS analysis is calculated, and the thickness of the softened Ni layer and the thickness of the Fe—Ni layer are calculated based on the ratio and the actual thickness of the Ni plating layer.

<Evaluation Method>

Evaluation specimens are prepared from nickel-plated steel sheets having respective plating thicknesses, and the corrosion resistances of the evaluation specimens are investigated by immersing these evaluation specimens into bioethanol mixed gasoline. The corrosion resistance is determined based on the presence or the non-presence of generation of rust.

A corrosive liquid which experimentarily imitates bioethanol mixed gasoline is used.

The corrosive liquid is prepared as follows. 10 ppm of formic acid and 20 ppm of acetic acid are added to regular gasoline which is stipulated in JIS K2202, and 10% of bioethanol which is stipulated in JASO M361 is further added to the regular gasoline thus producing imitated deteriorated gasoline. Aiming at the further enhancement of corrosiveness, corrosive water is prepared by adding 100 ppm of formic acid, 200 ppm of acetic acid and 100 ppm of chlorine to pure water, and 10 weight % of the corrosive water is added to the deteriorated gasoline thus preparing a corrosive liquid.

The corrosive liquid is in a two-layered divided state where an upper layer is made of the deteriorated gasoline and a lower layer is made of the corrosive water.

An evaluation specimen (nickel-plated steel sheet) is arranged in a hermetically sealed container in a state where one half of the evaluation specimen is immersed in the corrosive liquid, and the hermetically sealed container is held in a temperature controlled bath at a temperature of 45° C. for a predetermined time.

As a result, as shown in FIG. 1, the evaluation specimen is formed of separated portions consisting of, in a descending order from above, a gas phase portion 11 which is brought into contact with fuel vapor (gas phase) of deteriorated gasoline, a liquid phase portion 12 which is brought into contact with deteriorated gasoline (liquid phase) and a water phase portion 13 which is brought into contact with corrosive water (water phase).

Then, the corrosion resistance of the evaluation specimen against fuel vapor is evaluated by investigating the corrosion of the gas phase portion 11 of the evaluation specimen.

In the evaluation, the evaluation specimen which is bent at 90° with a plated surface thereof formed as an inner surface (recessed portion) is used. A radius of a valley portion is set to 1.0 mm. The generation of rust in the formed valley portion is evaluated. From the result of many experiments, it is found that the generation of rust in the gas phase portion can be suppressed by setting a thickness of a softened Ni layer to a value which falls within a range of 0.9 to 8.1 μm.

When the thickness of the softened Ni layer is less than 0.9 μm, the sufficient corrosion resistance cannot be acquired in the gas phase portion of the formed portion.

On the other hand, when the thickness of the softened Ni layer exceeds 8.1 μm, burrs are liable to be generated on edge surfaces at the time of slitting a steel sheet. These burrs are considered to be generated due to the elongation of a Ni layer following a blade for slitting. When the burrs are present, at the time of manufacturing a pipe by welding the edge surfaces of the steel sheet by high frequency induction welding or the like, a pipe welded portion is formed into a non-uniform shape. Accordingly, such a nickel plating thickness is not preferable.

Here, to set the thickness of the softened Ni layer to a value which falls within a range of 0.9 to 8.1 μm, nickel plating having a thickness of 2 to 10 μm is necessary by performing plating, and the softened Ni layer is obtained by applying heat diffusion treatment to the steel sheet after the plating is performed.

<Pipe Forming>

A pipe is manufactured using the steel sheet to which heat diffusion treatment is applied. A shape of the steel sheet is modified by a leveler, and the steel sheet is slit into a predetermined outer size by a slitter. Thereafter, the steel sheet is formed into a pipe shape by a former, and longitudinal edge surfaces of the steel sheet are seam-welded to each other by high frequency induction welding thus manufacturing the pipe.

The pipe may be a fuel supply pipe for introducing fuel into a tank, a pipe for introducing fuel into an engine from a tank or a pipe for ventilation.

Figure 2A:
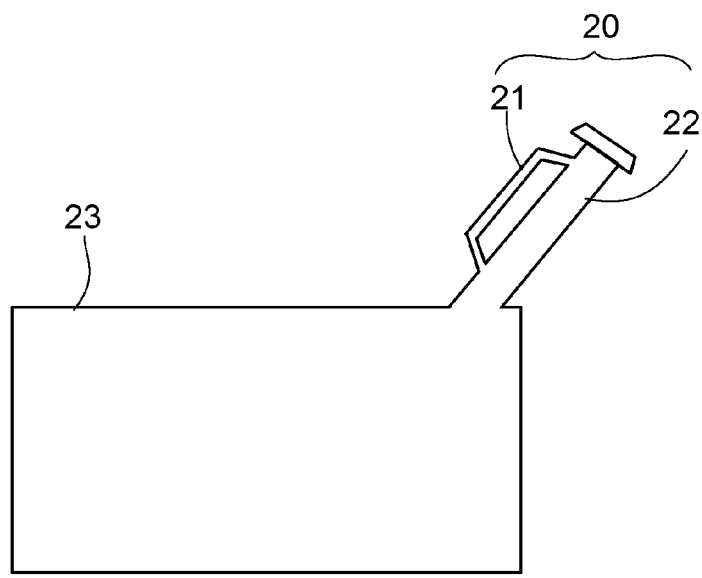

As shown in FIG. 2(a), a fuel supply pipe 20 is mounted on a fuel tank 23 in such a manner that the fuel supply pipe 20 extends obliquely in the upward direction from an upper portion of the fuel tank 23.

Further, a small-diameter pipe portion 22 is connected to the fuel supply pipe 20 in such a manner that a small-diameter pipe portion 22 is branched from a middle portion of a large-diameter pipe portion 21 through which fuel passes. The small-diameter pipe portion 22 connects an upper portion of the large-diameter pipe portion 21 and a lower portion of the large-diameter pipe portion 21 with each other for ventilation.

The branched small-diameter pipe portion 22 of the fuel supply pipe 20 is particularly required to have corrosion resistance against fuel vapor and hence, it is preferable that a nickel plating layer having a plating thickness of 0.5 to 10 μm is formed on an inner surface of the small-diameter pipe portion 22.

Figure 2B:
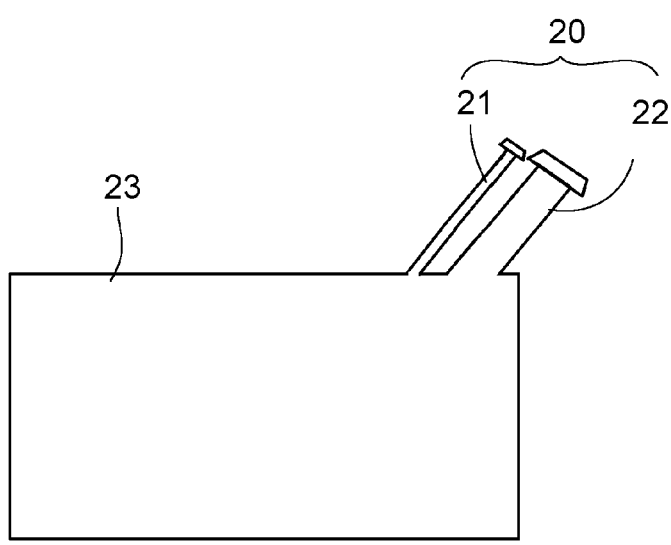

The fuel supply pipe 20 defined by the present invention is not limited to a shape shown in FIG. 2(a). For example, as shown in FIG. 2(b), even when the small-diameter pipe portion 22 is mounted on the fuel tank 23 in a shape independent from a large-diameter pipe portion 21 through which fuel passes, there is no difference between the small-diameter pipe portion 22 shown in FIG. 2(b) and the small-diameter pipe portion 22 in FIG. 2(a) with respect to a point that the corrosion resistance against fuel vapor is particularly required and hence, the fuel supply pipe 20 defined by the present invention also includes the fuel supply pipe 20 shown in FIG. 2(b) in terms of configuration.

EXAMPLES

The present invention is explained hereinafter in further detail using examples.

Example 1

A low carbon aluminum-killed steel sheet having a sheet thickness of 0.70 mm which is manufactured through cold-rolling and annealing is used as a sheet for plating.

The composition of a steel sheet which constitutes the sheet for plating is as follows.

C: 0.045%, Mn: 0.23%, Si: 0.02%, P: 0.012%, S: 0.009%, Al: 0.063%, N: 0.0036%, balance: Fe and unavoidable impurities The steel sheet is subjected to alkali electrolytic cleaning and pickling by immersion into a sulfuric acid and, thereafter, nickel plating having a plating thickness of 2 μm is applied to the steel sheet under conditions where matte plating and a watt bath are adopted thus obtaining a nickel-plated steel sheet. Thereafter, heat diffusion treatment is applied to the nickel-plated steel sheet under conditions where 800° C. and 1.5 min are adopted thus obtaining a steel sheet where a Fe—Ni diffusion layer having a thickness of 1.7 μm is formed on a surface of the steel sheet and a softened Ni layer having a thickness of 0.9 μm is formed on the Fe—Ni diffusion layer. The nickel plating thickness before the heat diffusion treatment is applied to the nickel-plated steel sheet is measured by an X-ray fluorometric analysis (using ZSX 100e made by Rigaku Corporation).

Examples 2 to 6

Steel sheets having a softened Ni layer and a Fe—Ni diffusion layer having thicknesses shown in Table 1 are obtained in the same manner as the example 1 except for that the nickel plating thickness and a heat diffusion treatment condition are changed to values shown in Table 1.

Comparison Examples

Comparison examples 1 to 5 are prepared such that nickel-plated steel sheets having nickel plating thicknesses shown in Table 1 are manufactured and heat diffusion treatment is applied to the steel sheets under the condition shown in Table 1 in the same manner as the embodiment 1 thus obtaining the steel sheets having a softened Ni layer and a Fe—Ni diffusion layer shown in Table 1.

<Evaluation>

Next, evaluation specimens are prepared from the respective nickel-plated steel sheets of the examples and the comparison examples. After holding the evaluation specimens in the temperature-controlled bath at a temperature of 45° C. for 2000 hours, the appearance of a gas phase portion of the evaluation specimens having the respective plating thicknesses is observed for investigating the generation of rust. The result of the investigation is shown in a column "result of rust generation in gas phase portion" in Table 1.

TABLE 1

|  | nickel plating thickness (μm) | softened Ni layer (μm) | Fe—Ni diffusion layer | result of rust generation in gas phase portion |
| --- | --- | --- | --- | --- |
| example 1 | 2 | 0.9 | 1.47 | not observed |
| example 2 | 3 | 1.24 | 2.78 | not observed |
| example 3 | 5 | 2.86 | 3.32 | not observed |
| example 4 | 7 | 3.82 | 3.34 | not observed |
| example 5 | 10 | 5.44 | 5.03 | not observed |
| example 6 | 10 | 8.1 | 2.15 | not observed |
| comparison example 1 | 0.25 | 0 | 0.31 | observed |
| comparison example 2 | 0.75 | 0.21 | 0.57 | observed |
| comparison example 3 | 1 | 0.31 | 0.93 | observed |
| comparison example 4 | 2 | 0.5 | 1.5 | observed |
| comparison example 5 | 5 | 0.31 | 4.98 | observed |

As can be clearly understood from Table 1, the generation of rust is not observed with respect to the steel sheets of the examples 1 to 6 of the present invention and hence, these steel sheets are excellent as a raw material for manufacturing a pipe having corrosion resistance against fuel vapor.

The above-mentioned corrosive liquid generates vapor having stronger corrosiveness than gasoline, light oil, bioethanol or bio-diesel fuel and hence, it is considered that no generation of rust in the test using such a corrosive liquid means no generation of rust also against gasoline, light oil, bioethanol or bio-diesel fuel.

On the other hand, rust is generated in the nickel plated steel sheets of the comparison examples 1 to 5 and hence, these steel sheets have poor practicability as a raw material for manufacturing a pipe having corrosion resistance against fuel vapor.

INDUSTRIAL APPLICABILITY

The steel sheet for manufacturing a pipe according to the present invention can suppress the generation of rust when the steel sheet is exposed to fuel vapor of fuel such as gasoline, light oil, bioethanol or bio-diesel fuel.

Further, the pipe and the fuel supply pipe manufactured using the steel sheet for manufacturing a pipe according to the present invention have excellent corrosion resistance against fuel vapor and hence, these pipes have extremely high industrial applicability.

DESCRIPTION OF REFERENCE NUMBERS AND SIGNS

11: gas phase portion
12: liquid phase portion
13: water phase portion
20: fuel supply pipe 21: large-diameter pipe portion
22: small-diameter pipe portion
23: fuel tank

We claim:

1. A fuel supply pipe having corrosion resistance against fuel vapor which is provided for supplying fuel to a fuel tank, wherein the fuel supply pipe comprises:

a large-diameter pipe portion through which the fuel passes; and a small-diameter pipe portion which makes an upper portion of the large-diameter pipe portion and a lower portion of the large-diameter pipe portion communicate with each other for ventilation, and a Fe—Ni diffusion layer and a softened Ni layer which is provided on the Fe—Ni diffusion layer are formed on an inner surface of at least the small-diameter pipe portion, and a thickness of the softened Ni layer is set to a value which falls within a range of 0.9 to 8.1 μm, said thickness providing an observed corrosion resistance against the fuel vapor; wherein the fuel vapor is a gasoline, light oil, bioethanol or bio-diesel fuel.

* * * * *